US009977899B2

(12) United States Patent
Roussellet et al.

(10) Patent No.: US 9,977,899 B2
(45) Date of Patent: May 22, 2018

(54) CYCLIC REDUNDANCY CHECK METHOD WITH PROTECTION FROM SIDE-CHANNEL ATTACKS

(71) Applicant: INSIDE SECURE, Aix en Provence (FR)

(72) Inventors: Mylène Roussellet, Aix en Provence (FR); Vincent Verneuil, Aix en Provence (FR)

(73) Assignee: Inside Secure, Meyreuil (FR)

( * ) Notice: Subject to any disclaimer, the term of this patent is extended or adjusted under 35 U.S.C. 154(b) by 0 days. days.

(21) Appl. No.: 14/397,330

(22) PCT Filed: Mar. 26, 2013

(86) PCT No.: PCT/FR2013/050646
§ 371 (c)(1),
(2) Date: Oct. 27, 2014

(87) PCT Pub. No.: WO2013/160575
PCT Pub. Date: Oct. 31, 2013

(65) Prior Publication Data
US 2015/0082435 A1    Mar. 19, 2015

(30) Foreign Application Priority Data

Apr. 25, 2012  (FR) ...................... 12 53804

(51) Int. Cl.
*G06F 21/55* (2013.01)
*H03M 13/09* (2006.01)
(Continued)

(52) U.S. Cl.
CPC ............ *G06F 21/556* (2013.01); *G06F 21/64* (2013.01); *H03M 13/09* (2013.01); *H04L 9/003* (2013.01);
(Continued)

(58) Field of Classification Search
CPC .............................. G06F 21/556; G06F 21/64
(Continued)

(56) References Cited

U.S. PATENT DOCUMENTS 5,377,270 A * 12/1994 Koopman, Jr. ........... H04L 9/12
340/5.26
6,310,870 B1 * 10/2001 Li ....................... H04B 7/2631
370/342
(Continued)

FOREIGN PATENT DOCUMENTS

EP          1 912 148 A1    4/2008

OTHER PUBLICATIONS

Wang, "Random Key rotation: Side-Channel countermeasure of NTRU cryptosystem for resource-limited devices", May 10, 2017, Elsevier, pp. 220-231.*
(Continued)

*Primary Examiner* — Taghi Arani
*Assistant Examiner* — Gregory Lane
(74) *Attorney, Agent, or Firm* — Brake Hughes Bellermann LLP (57) ABSTRACT

In an aspect, a method can include generating a cyclic redundancy check code for a binary data item, using a generator polynomial; and masking, using polynomial addition, the binary data item with a binary mask. The method can also include at least one of: storing, by a microcircuit, the masked binary data item in a memory of an electronic device; or transferring, by the microcircuit, the masked data item to another device. The cyclic redundancy check code for the binary data item can be generated from the masked binary data item to prevent discovery of the binary data item by a side-channel attack during the generating the cyclic redundancy check. The binary mask can be a multiple of a random number and the generator polynomial, such that
(Continued)

respective cyclic redundancy check code of the masked data item and the binary data item have a same result.

14 Claims, 4 Drawing Sheets

(51) Int. Cl.
*H04L 9/00* (2006.01)
*G06F 21/64* (2013.01)
(52) U.S. Cl.
CPC .... *H04L 2209/046* (2013.01); *H04L 2209/34* (2013.01)
(58) Field of Classification Search
USPC .............................................. 726/23; 713/189
See application file for complete search history.

(56) References Cited

U.S. PATENT DOCUMENTS

| | | | | |
|---|---|---|---|---|
| 7,523,305 | B2* | 4/2009 | Skovira | H04L 1/0061 340/5.23 |
| 8,156,343 | B2* | 4/2012 | Robinson | G06F 21/71 711/152 |
| 2002/0170013 | A1* | 11/2002 | Bolourchi | H03M 13/09 714/758 |
| 2004/0264468 | A1* | 12/2004 | Horton, Jr. | H04L 29/06027 370/392 |
| 2005/0108617 | A1* | 5/2005 | Lappin, Jr. | H04L 69/22 714/781 |
| 2005/0154960 | A1* | 7/2005 | Sydir | H03M 13/6516 714/758 |
| 2010/0039286 | A1* | 2/2010 | Robbins | G01V 11/002 340/855.3 |
| 2010/0077225 | A1* | 3/2010 | Salgado | G06F 21/52 713/189 |
| 2010/0302978 | A1* | 12/2010 | Roh | H04B 7/024 370/310 |
| 2011/0216843 | A1* | 9/2011 | Hsuan | H04L 1/0041 375/260 |
| 2011/0271169 | A1* | 11/2011 | Pi | H03M 13/09 714/807 |
| 2012/0204085 | A1* | 8/2012 | Tsai | H04L 1/0061 714/807 |

OTHER PUBLICATIONS

Jun. 27, 2013 Search Report issued in International Patent Application No. PCT/FR2013/050646.

Gorshe; "CRC-16 Polynomials Optimized for Applications Using Self-Synchronous Scramblers;" Proceedings of IEEE International Conference on Communications; Apr. 2002; vol. 5; pp. 2791-2795.

* cited by examiner

CYCLIC REDUNDANCY CHECK METHOD WITH PROTECTION FROM SIDE-CHANNEL ATTACKS

The present invention relates to a method for processing a binary data item, comprising a step of calculating a cyclic redundancy check code by means of a generator polynomial. The present invention also relates to protecting integrated circuits equipped with a semiconductor from side-channel attacks.

Integrated circuits on semiconductor chip that are used in secured applications are subjected to various attacks, in particular side-channel attacks based on the observation of their current consumption, or their magnetic or electromagnetic radiation. Such attacks aim to discover the sensitive data they handle, for example encryption keys, application data, intermediate calculation variables, etc.

The most frequent side-channel attacks implement statistical analysis methods such as DPA ("Differential Power Analysis") or CPA ("Correlation Power Analysis") analyses. These analysis techniques enable the key of an encryption algorithm to be found by acquiring many circuit consumption curves. DPA consists of a statistical classification of current consumption curves according to a hypothesis on the key searched for. CPA is based on a current consumption model and involves calculating a correlation coefficient between, on the one hand, the points of consumption measured and, on the other hand, an estimated consumption value, calculated from the consumption model and a hypothesis on the operation executed by the circuit.

Various hardware and/or software countermeasures are generally implemented to counter such attacks. In particular, sensitive data is generally stored or transferred in a masked form, i.e. after being combined with a binary mask supposed to be unknown by an attacker, and are generally unmasked only when they are in an area fully protected from attacks.

Secondly, the data handled by the integrated circuits is generally protected from data corruption which may be accidental or result from an intentional action. A data corruption may for example occur during an alteration of the threshold voltage of memory cells in which the data is stored, during electromagnetic interference while data is conveyed on a data bus, or during an attack by fault injection. During its storage or transfer, the data thus comes with an error detection code referred to as "checksum". This may for example be a parity bit, a Hamming code, a CRC code ("cyclic redundancy check"), etc.

Figure 1:
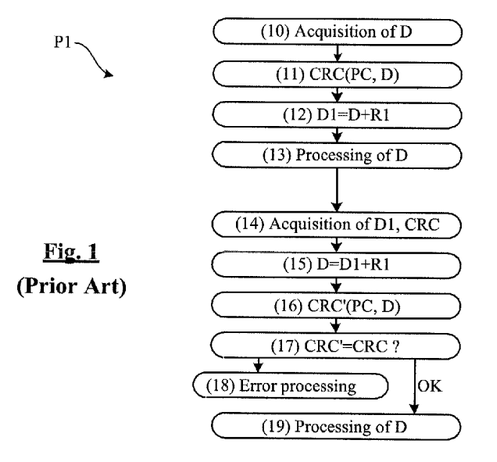
FIG. 1 described above shows steps of a conventional data processing method.

FIG. 1 schematically shows a conventional method P1 for processing a data item D combining masking and error detection by means of a code CRC. The method comprises an initial phase of processing the data item and a subsequent processing phase. The initial phase comprises:
 a step 10 of acquiring the data item D,
 a step 11 of calculating the code CRC of the data item D by means of a generator polynomial PC,
 a step 12 of masking the data item with a mask R1, by adding the latter to the mask R1, to obtain a masked data item D1, and
 a step 13 of processing the data item D.

In step 11, the code CRC is calculated by polynomial division of the data item by the polynomial PC, done in GF(2)[X], i.e. the field of polynomials the coefficients of which belong to the finite field GF(2) (Galois field), which forms the smallest known finite field. The addition executed in step 12 is the polynomial addition in GF(2)[X] corresponding in Boolean algebra to the bit-by-bit Exclusive OR of the mask R1 and of the data item D. Finally, the processing step 13 may consist in storing the data item in a memory or transmitting it to an entity other than the one which has executed steps 10 to 12. In this case, the data item is stored or transmitted in its masked form D1 and comes with the code CRC.

The subsequent processing phase comprises:
 a step 14 of acquiring the masked data item D1 and its code CRC (receiving or reading in a memory),
 a step 15 of unmasking the data item D, i.e. of removing the mask R1, by adding the data item D1 masked with the mask R1,
 a step 16 of calculating a code CRC' of the data item D, by means of the polynomial PC,
 a step 17 of comparing the codes CRC and CRC',
 if the codes CRC and CRC' are different, an error processing step 18, and
 if the codes CRC and CRC' are identical, a step 19 of processing the data item D.

Some embodiments of the invention are based on the discovery of a security failure in this data processing method. This security failure relates to step 11 or 16 of calculating the code CRC, performed from the unmasked data item, without which the code CRC would be invalid. Now, we have discovered that this calculation step is vulnerable to certain types of attacks which can enable the value of the data item D to be discovered. In particular, a "template"-type attack is possible. The attack involves forming a database of all the profiles of current consumption of the circuit performing the calculation of the code CRC according to the value of the data item D. The observation of the consumption profile of the circuit during the calculation of the code CRC then enables the corresponding value of the data item D to be found in the database. A DPA-type attack during the calculation of the code CRC could also, in certain applications, be possible.

It could thus be desirable to improve the security provided by a data processing method including a code CRC calculation.

Some embodiments of the present invention relate to a method for processing a binary data item, comprising a step of calculating a cyclic redundancy check code for the data item by means of a generator polynomial, wherein the step of calculating the cyclic redundancy check code comprises the steps of masking the data item with a random binary mask that is a multiple of the generator polynomial, and generating the cyclic redundancy check code for the data item from the masked data item.

According to one embodiment, the method comprises the steps of splitting the data item into at least two portions, masking a first portion of the data item with a first random binary mask that is a multiple of the generator polynomial, generating a first cyclic redundancy check code for the first masked portion, concatenating the first cyclic redundancy check code with a next portion of the data item, to form an intermediate data item, masking the intermediate data item with a second random binary mask that is a multiple of the generator polynomial, and generating a second cyclic redundancy check code for the masked intermediate data item.

According to one embodiment, the method comprises a step of generating the random binary mask comprising the steps of generating an any random number, and multiplying the any random number by the generator polynomial.

According to one embodiment, the data item comprises N bits and the generator polynomial comprises P bits, and the generated any random number comprises at least N−P bits.

According to one embodiment, the method comprises a step of generating the random binary mask comprising the steps of generating a first any random number, multiplying the first any random number by the generator polynomial to obtain a first mask portion, generating at least one second any random number, multiplying the second any random number by the generator polynomial to obtain at least one second mask portion, and concatenating the first and second mask portions.

According to one embodiment, the data item comprises N bits and the generator polynomial comprises P bits, and each generated any random number comprises a number of bits equal to (N−nP)/n, n being the number of any random numbers generated.

According to one embodiment, the method comprises the steps of acquiring the data item in a form masked with a first any random binary mask forming a storage or transfer mask, together with a first cyclic redundancy check code, removing the first mask from the data item, masking the data item with a second random binary mask that is a multiple of the generator polynomial, generating a second cyclic redundancy check code from the data item masked with the second mask, and comparing the first and the second cyclic redundancy check codes.

According to one embodiment, the method comprises the steps of acquiring the data item in a form masked by a first any random binary mask forming a storage or transfer mask, together with a first cyclic redundancy check code, masking the data item a second time with a second random binary mask that is a multiple of the generator polynomial, removing the first mask from the data item masked twice, generating a second cyclic redundancy check code from the data item masked with the second mask, and comparing the first and the second cyclic redundancy check codes.

According to one embodiment, the method comprises the steps of acquiring the data item in a form masked with a first binary mask that is a multiple of the generator polynomial, forming a storage or transfer mask, generating a second cyclic redundancy check code from the data item masked with the first mask, and comparing the first and the second cyclic redundancy check codes.

Some embodiments of the present invention also relate to an electronic device comprising means for processing a data item configured to implement processing steps in accordance with the method described above.

Some embodiments of the present invention also relate to a portable object comprising such an electronic device.

Some embodiments of the present invention also relate to a method for storing or transferring a data item, comprising a prior step of masking the data item with a random binary mask, wherein the data item is stored or transferred in a form masked with a random binary mask that is a multiple of a generator polynomial for generating a cyclic redundancy check code.

According to one embodiment, the method comprises a step of generating the random binary mask comprising the steps of generating an any random number, and multiplying the any random number by the generator polynomial.

According to one embodiment, the method comprises a step of generating the random binary mask comprising the steps of generating a first any random number, multiplying the first any random number by the generator polynomial to obtain a first mask portion, generating at least one second any random number, multiplying the second any random number by the generator polynomial to obtain at least one second mask portion, and concatenating the first and second mask portions.

Some embodiments of the present invention also relate to an electronic device comprising means for storing and transferring a data item, configured to store or transfer the data item in accordance with the storage or transfer method described above.

Some embodiments of data processing methods and circuits according to the present invention will be described in greater detail in the description below in relation with, but not limited to, the following figures in which.

Some embodiments of this invention are based on the discovery that the code CRC of a data item can be validly generated from a masked data item, provided that the data item is masked by means of a mask that is a multiple of the generator polynomial for generating the code CRC. A random mask having this property can be generated from a random number, by multiplying the random number by the generator polynomial. We shall consider the following case as a digital example:

1) let D be an any data item of 32 bits, for example D=a120b721$_h$, ("h" representing the writing of the data item in base 16). The data item can also be written as a $31^{st}$-order polynomial:

$$D=X^{31}+X^{29}+X^{24}+X^{21}+X^{15}+X^{13}+X^{12}+X^{10}+X^9+X^8+X^5+1$$

2) let PC be a $16^{th}$-order generator polynomial, for example the known polynomial CRC-16-DECT:

$$PC=X^{16}+X^{10}+X^8+X^7+X^3+1,$$

forming a 17-bit word equal to 10559$_h$.

It shall be noted that a conventional calculation of the code CRC of the data item D, by dividing the latter by the polynomial PC in the finite field GF(2)[X], gives a $15^{th}$-order polynomial, i.e. here:

$$CRC=X^{15}+X^{12}+X^8+X^7+X^5+X^3+X+1,$$

in other words, a 16-bit code equal to 91ab$_h$.

3) instead of calculating the code CRC using the data item D, we shall consider an any random number r2 of 15 bits, for example:

$$r2=2e03_h, \text{ i.e.}$$

$$r2=X^{13}+X^{11}+X^{10}+X^9+X+1$$

4) we shall multiply r2 by the generator polynomial, to obtain a 32-bit mask R2:

$$R2=r2\times PC=2e83509b_h$$

5) we shall mask the data item D with the mask R2 (polynomial addition in GF(2)[X], corresponding to a bit-by-bit Exclusive OR operation), to obtain a masked data item D2, i.e. here:

$$D2=D+R2=8fa3e7ba_h$$

6) to calculate the code CRC of the data item D, we shall perform the polynomial division of the masked data item D2 by the polynomial PC in GF(2)[X], i.e. the polynomial division modulo 2. The following is obtained:

$$CRC=91ab_h$$

It thus appears that the code CRC calculated from the masked data item D2 is identical to the code CRC calculated from the unmasked data item D. It can be shown that this rule is true for any mask R2 that is a multiple of PC.

According to a preferred embodiment, the mask R2 has the same length as the data item D to be masked, so as to mask all the bits of the data item. In this case, the following rule is observed: if the data item D comprises N bits and the polynomial PC comprises P bits, then the any random number r2 comprises Q bits with Q equal to N−P bits. In the example above N=32, P=17, Q=15. Furthermore, the code CRC obtained has P−1 bits, i.e. here 16 bits.

Figure 2:
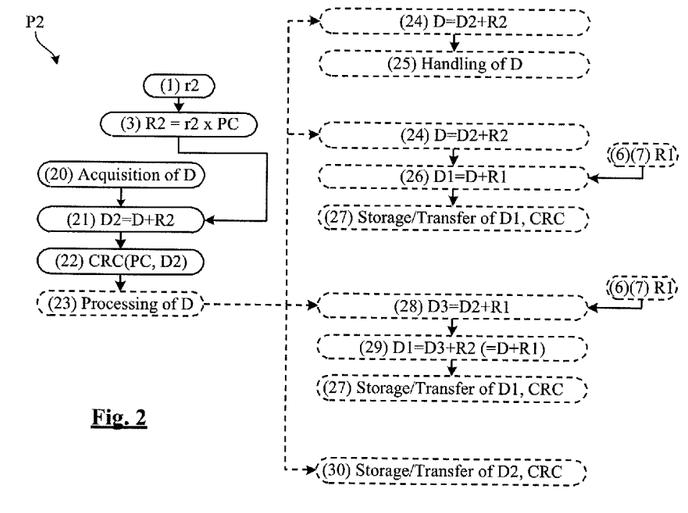
FIG. 2 shows steps of a first phase of a data processing method according to the present invention.

FIG. 2 describes an initial phase P2 of one embodiment of a data processing method according to the present invention. The initial phase comprises:
  a step 1 of generating the random number r2,
  a step 3 of generating the random mask R2 by multiplying r2 by PC,
  a step 20 of acquiring the data item D,
  a step 21 of masking the data item with the mask R2, by adding the latter to the mask R2, to obtain the masked data item D2, and
  a step 22 of calculating the code CRC of the data item D from the polynomial PC and the masked data item D2, such that the calculation step is protected in particular from a "template"-type attack, and
  a step 23 of processing the data item.

Various examples of embodiments of the processing step 23 are shown on FIG. 2. It is assumed that step 23 is performed immediately after calculating the code CRC and that the mask R2 is available to the unit or entity which executes this step.

Example 1: the processing step 23 comprises a step 24 of removing the mask R2, by polynomial addition in GF(2)[X] of the data item D2 masked with the mask R2, followed by a step 25 of handling the unmasked data item D. These steps are preferably performed by a circuit or a portion of circuit protected from attacks. The utilization step 25 comprises for example the execution of a cryptographic calculation, the data item being a message to be encoded, a key or a sub-key used to encode a message.

Example 2: the processing step 23 comprises the step 24 of removing the mask R2, followed by a step 26 of masking the unmasked data item D with an any random mask R1, i.e. that is not necessarily a multiple of PC, to obtain a masked data item D1. During a step 27, the masked data item D1 is stored in a memory or transferred to a unit or entity other than the one which conducted the above-mentioned steps, together with its code CRC.

Example 3: the processing step 23 comprises a step 28 of masking the masked data item D2 with the any random mask R1, to obtain a data item D3 masked twice. Step 28 is followed by a step 29 of removing the mask R2, by addition of the mask to the data item D3, and leads to the same result as the above-mentioned step 26, i.e. the data item D1 masked by the mask R1. Step 29 is followed by the above-mentioned step 27.

Example 4: in this example, the masked data item D2 is merely stored in a memory or transferred to a unit or entity other than the one which conducted the above-mentioned steps, together with its code CRC (step 30).

It will be noted that the masking step 26 of the example 2 or the masking step 28 of the example 3 is preceded by a step 6 of generating the mask R1 or a step 7 of acquiring the mask R1.

It will also be noted that example 3 is a preferred alternative of example 2, which has the disadvantage of leaving the data item in plain language between step 24 and step 26, which may be undesirable if the mask is removed in a non-secured environment.

Finally, the processing step 23 may comprise a different combination of the various steps 24 to 30 that have just been described.

Figure 3:
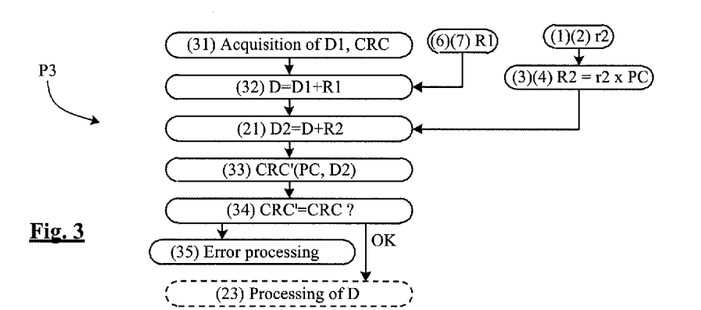
FIG. 3 shows steps of a second phase of the data processing method according to the present invention.
Figure 4:
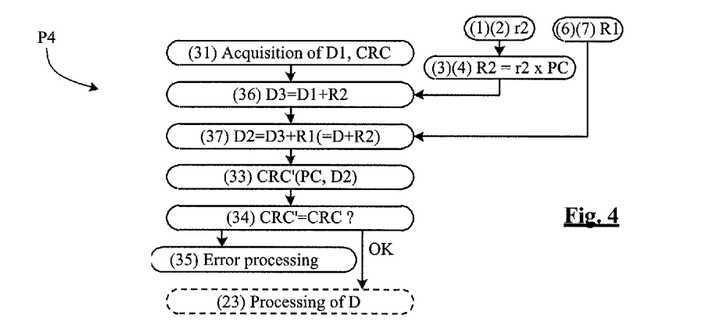
FIG. 4 shows an alternative embodiment of the second phase of the method.
Figure 5:
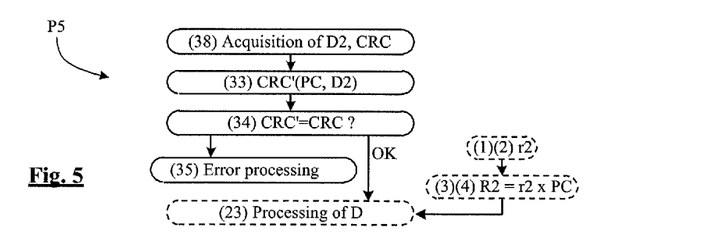
FIG. 5 shows another alternative embodiment of the second phase of the method.

The initial processing phase P2 may be followed by subsequent processing phases P3, P4, P5, shown on FIGS. 3, 4 and 5, during which the code CRC is used to check the integrity of the masked data item D1 or D2.

Phase P3, on FIG. 3, is initiated by a step 31 of acquiring the masked data item D1 together with its code CRC. This step occurs for example after the above-mentioned step 27. Step 31 is followed by a step 32 of removing the mask R1, by adding the latter to the masked data item D1, then by the above-mentioned step 21 of masking the data item D with the mask R2, by adding the latter to the data item, to obtain the masked data item D2. Step 21 is followed by a step 33 of calculating a code CRC' of the data item D from its masked value D2 and the polynomial PC. Step 33 is followed by a step 34 of comparing the code CRC' with the code CRC received, by an error processing step 35 if the codes CRC and CRC' are different, otherwise by step 23 of processing the data item D, various examples of which have been described above (handling, storage or transfer).

The error processing step 35 may comprise various actions depending on the nature of the operation being executed, from sending a simple error signal through to executing security actions, such as interrupting the operation being executed or even destroying sensitive data or resetting the circuit performing this operation.

The unmasking step 32 is preceded by step 6 of generating the mask R1 or step 7 of acquiring the mask R1. As the mask R1 has already been generated, step 6 is only possible if this generation is repeatable, for example by means of a known random seed and a deterministic generating function. Otherwise, the acquisition step 7 must be provided. It involves for example reading the mask in a register or in a memory, at an address that is predetermined or received via a command.

The masking step 21 is preceded by step 3 of generating the mask R2 and includes the multiplication of r2 by the polynomial PC, or by a step 4 of acquiring the mask R2. Step 3, where applicable, is preceded by step 1 of generating a random number r2 or by a step 2 of acquiring the number r2. It is not necessary here, for the masking during the calculation step 33, for the number r2 generated in step 1 to be identical to the one generated in step 1 in FIG. 2.

Phase P4, on FIG. 4, is a preferred alternative of phase P3, which has the disadvantage of leaving the data item in plain language between step 32 and step 21. Phase P4 is also initiated by step 31 of acquiring the masked data item D1 together with its code CRC. Step 31 is followed by a step 36 of masking the masked data item D1 with the mask R2, to obtain the data item D3 masked twice. Step 36 is followed by a step 37 of removing the mask R1, by addition of the mask R1 to the data item D3, to obtain the data item D2 masked with the mask R2. Step 37 is followed by the above-mentioned step 34 of comparing the code CRC' with the code CRC received, by the above-mentioned error processing step 35, if the codes CRC and CRC' are different, otherwise by the above-mentioned step 23 of processing the data item D.

The masking step 36 is preceded by step 3 of generating the mask R2 or by step 4 of acquiring the mask R2. Where applicable, step 3 is preceded by step 1 of randomly generating the number r2 or by step 2 of acquiring the number r2. Also, the unmasking step 37 is preceded by step 6 of generating the mask R1 or by step 7 of acquiring the mask R1.

Phase P5, on FIG. 5, is one simple and advantageous embodiment of a processing phase according to the present invention. In this embodiment, the mask R2 is not only used during the calculation of the code CRC, but it is also used as storage or transfer mask for storing or transferring the data item D. Thus, phase P5 is initiated by a step 38 of acquiring the masked data item D2 together with the code CRC, which occurs for example after the above-mentioned step 30. The acquisition step is directly followed by steps 33 and 34 of calculating the code CRC' and of comparing the latter with the original code CRC, without the need to remove the mask R2. As above, steps 33, 34 are followed by the error processing step 35 or by step 23 of processing the data item D.

The processing step 23 may previously require the execution of step 3 of generating the mask R2 or of step 4 of acquiring the mask R2, for example if it includes steps 24 and 25 (FIG. 2). As indicated above, step 3 is then preceded by step 1 or step 2. In this case, as the mask R2 has been previously generated, step 3 is only possible if r2 is known. Step 3 is then preceded by step 1 of generating the number r2 or by a step 2 of acquiring the number r2. As the number r2 has been previously generated, step 1 is only possible if the number r2 is generated from a known random seed and a known generating function. Otherwise, the acquisition step 2 must be performed. It involves for example reading the number r2 in a memory or in a register, at an address that is predetermined or received via a command. In this case, it may be preferred to execute instead the acquisition step 4, which involves for example reading the mask R2 in a memory or in a register, at an address that is predetermined or received via a command.

Figure 6:
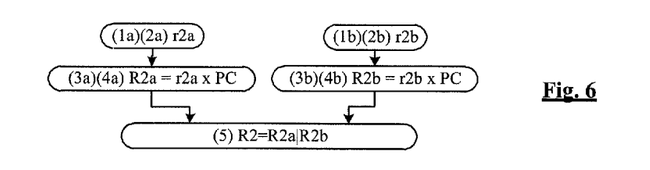
FIG. 6 shows a first alternative of certain steps of the data processing method according to the present invention.

FIG. 6 shows a method for generating the mask R2 by concatenating fragments of mask, which can be used when we have a random number generator not enabling a number r2 of Q bits with Q equal to N–P bits to be generated. The method comprises a step of generating 1a or a step of acquiring 2a a first random number r2a, and a step of generating 1b or acquiring 2b a second random number r2b. Step 1a or 2a is followed by a step 3a of generating a first fragment R2a of the mask, by multiplying r2a by the polynomial PC. Similarly, step 1b or 2b is followed by a step 3b of generating a second fragment R2b of the mask by multiplying r2b by the polynomial PC. Steps 3a and 3b are followed by a step 5 of concatenating the two fragments R2a, R2b, to obtain the mask R2. Alternatively, and in particular during the above-mentioned phases P3 or P4, step 3a can be replaced with a step 4a of acquiring the fragment R2a, and step 3b can be replaced with a step 4b of acquiring the fragment R2b.

The mask can also be generated with a larger number of fragments r2i. Generally, if the data item comprises N bits and the generator polynomial comprises P bits, each of the fragments r2i has a number of bits equal to (N−nP)/n, n representing the number of fragments r2i generated.

Figure 7:
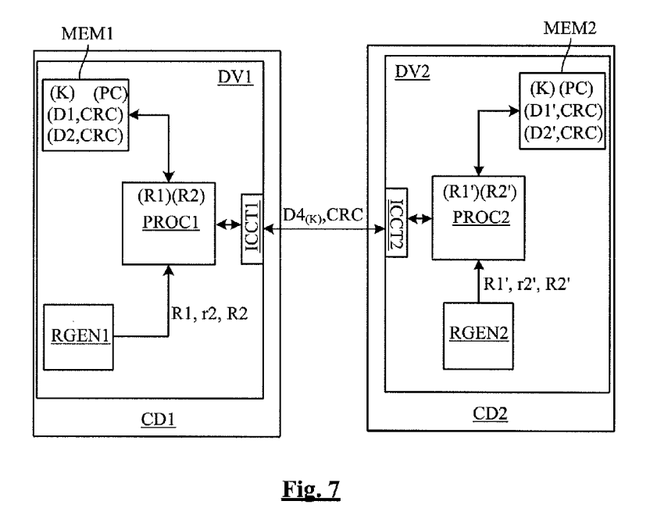
FIG. 7 shows data processing devices according to the present invention.

FIG. 7 shows electronic devices DV1, DV2 configured to implement a data processing method according to the present invention. The devices DV1, DV2 are for example integrated circuits on semiconductor chips each arranged on a medium CD1, CD2. The device DV1 forms for example a contact and/or contactless smart card, a contactless electronic tag, an SD or micro-SD card, or any other portable electronic device. The device DV2 forms for example a smart card reader, a tag reader, an SD card reader, or any other type of terminal compatible with the device DV1.

Each of the devices DV1, DV1 comprises a processor PROC1, PROC2, a memory MEM1, MEM2, a random generator RGEN1, RGEN2 and a wired, wireless or contactless communication interface circuit ICCT1, ICCT2. Each of the devices is equipped with software or hardware encryption means (not represented), with a shared encryption key K and with a shared generator polynomial PC, the key K and the polynomial PC being for example stored in their respective memories.

As an example of operation, a storage and transfer sequence is considered here during which the device DV1 stores a data item D in its memory MEM1, then transfers it to the device DV2, which stores it in its memory MEM2. During an initial processing phase corresponding to the above-mentioned phase P2 (FIG. 2), the processor PROC1 generates or receives the data item D, calculates its code CRC, then stores it in the memory MEM1 in its masked form D1 together with the code CRC (step 27, FIG. 2). The mask R1 used for this purpose is supplied by the generator RGEN1 and is kept in a register of the processor. Later, the processor PROC1 establishes a data link with the device DV2, through the circuits ICCT1, ICCT2. Then, the processor PROC1 reads the masked data item D1 and the code CRC and executes the phase P4 (Cf. FIG. 4) to check the code CRC. The mask R2 used for this purpose is calculated by the processor PROC1 from a random number r2 supplied by the generator RGEN1, or is directly supplied by the latter. When the code CRC is checked, the processor PROC1 executes a processing sequence protected from attacks, comprising the removal of the mask R1 and the transformation of the data item D into a data item $D4_{(K)}$ encoded by means of the key K. Then, the processor sends the data item $D4_{(K)}$ and the code CRC to the device DV2. The processor PROC2 decodes the data item D by means of its own key K, masks it with a mask R2' calculated from a random number r2' supplied by the generator RGEN2 or directly supplied by the latter, to obtain a data item D2', checks its code CRC (steps 33, 34, FIG. 3), applies an any mask R1' to it to obtain a data item D3' (step 28, FIG. 2), stores the mask R1' in a register, removes the mask R2' (step 29, FIG. 2) to obtain a data item D1', then stores the data item D1' in its memory MEM2 together with the code CRC (step 27, FIG. 2).

In one alternative embodiment, the masks R2, R2' are used both as storing masks and as masks for calculating the code CRC. The data items D2, D2' coming with the code CRC are then stored in the memories MEM1, MEM2, instead of the data items D1, D1'.

In another alternative not involving any encryption method to transfer the data item D, the mask R2 is determined during a phase of coupling the devices DV1, DV2 and is kept in their respective memories. The data item is transmitted to the device DV2 in its masked form D2, the mask R2 therefore also being used here as a transfer mask.

Figure 8:
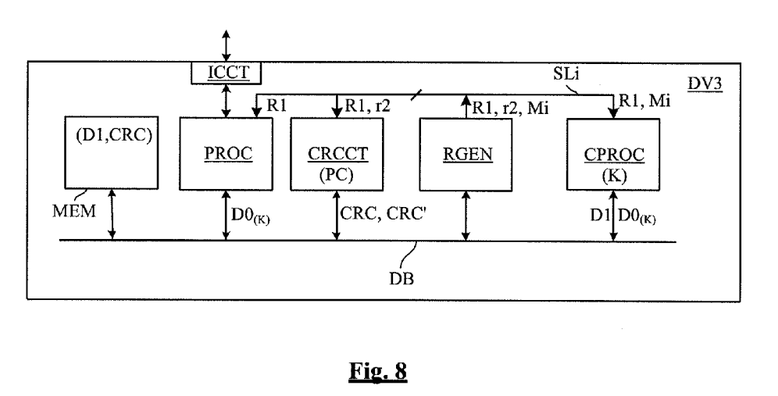
FIG. 8 shows another example of a data processing device according to the present invention.

FIG. 8 shows another example of electronic device DV3 configured to implement a data processing method according to the present invention. The device DV3 is for example an integrated circuit of the above-mentioned type, mounted onto a portable medium, a signal decoding integrated circuit (TV decoder for example), a payment terminal integrated circuit, etc. The device DV3 comprises a processor PROC and a communication interface circuit ICCT of the above-mentioned type, directly coupled to the processor PROC. It also comprises an encryption coprocessor CPROC having a secret key K, a memory MEM, a random generator RGEN, and a circuit CRCCT dedicated to the calculation of codes CRC. These units are coupled to the processor through a data bus DB. Other links between these units, in particular an address bus and a control bus, are not represented for the sake of simplicity. A set of specific links SLi is also provided, to exchange masks or random variables without going through the data bus DB. These specific links SLi particularly enable the generator RGEN:
- to provide the coprocessor CPROC with random masks Mi used to implement countermeasures (for example against DPA-type attacks)
- to provide the circuit CRCCT, the processor PROC, and the coprocessor CPROC with an any random mask R1 to store or transfer data,
- to provide the circuit CRCCT with the any random number r2, the latter being configured here to supply the random mask R2 that is a multiple of a polynomial PC, from the number r2.

As an example, a data processing sequence is considered during which the processor PROC must decode a message M received via the interface circuit ICCT. The encoded message M is of the type $F_K$ [D, CRC] and contains a data item D and its code CRC that have been concatenated and encoded together by means of an encryption function F and the key K.

The processor applies the message M to the data bus DB and asks the coprocessor CPROC to decode it. The latter loads the message M into an internal register (not represented), asks the generator RGEN to provide it with one or more countermeasure masks Mi, as well as a storage and transfer mask R1. The mask R1 is also supplied to the circuit CRCCT and to the coprocessor CPROC, each of them storing it in an internal register (not represented). During a sequence protected from attacks, the coprocessor decodes the message by means of the key K, to obtain the data item D and its code CRC, masks the data item D with the mask R1 to obtain the masked data item D1, applies the data item D1 to the data bus, asks the generator RGEN to provide a random number r2 to the circuit CRCCT and asks the circuit CRCCT to calculate its code CRC. The latter generates the mask R2, reads the data item D1 on the bus, masks the data item with R2 to obtain the masked data item D3 (step 36, FIG. 4), removes the mask R1 to obtain the masked data item D2 (step 37, FIG. 4), calculates a code CRC' and applies it to the bus DB. The coprocessor compares the code CRC received with the data item and the code CRC' calculated by the circuit CRCCT, and, if the two codes are identical, indicates to the processor PROC that the data item has been correctly decoded. The processor takes the data item D1 and the code CRC from the data bus, and executes one or more processing steps (Cf. FIG. 2).

In one alternative, the mask R2 is used as a storage and transfer mask, instead of the mask R1. In this case, the mask R2 is no longer generated by the circuit CRCCT, but is supplied by the generator RGEN instead of the mask R1. The generator RGEN is then equipped with a register for receiving the polynomial PC and with a multiplier. The steps of double masking, of removing the mask R1 and of removing the mask R2 executed by the circuit CRCCT are no longer necessary.

Figure 9:
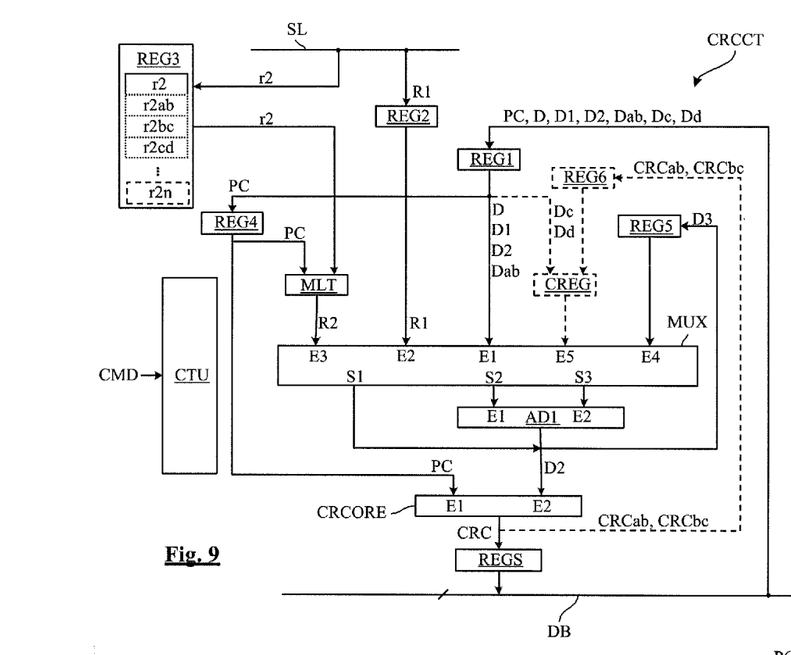
FIG. 9 shows an example of an embodiment of a code CRC calculation circuit according to the present invention.

FIG. 9 represents one embodiment of the circuit CRCCT enabling the examples of data processing methods that have just been described to be implemented. The circuit CRCCT comprises input registers REG1, REG2, REG3, buffer registers REG4, REG5, an output register REGS, a multiplier MLT, a polynomial adder AD1 (for example a series of Exclusive OR gates with two inputs), a cyclic redundancy check code generating circuit CRCORE, and a multiplexing unit MUX. These various components are controlled by a control unit CTU which receives commands CMD sent by the above-mentioned processor or coprocessor.

The register REG1 comprises an input linked to the data bus DB and is provided to sequentially receive the polynomial PC and a data item the code CRC of which must be calculated, for example the data item D, the masked data item D1 or the masked data item D2. The output of the register REG1 is linked to an input of the register REG4, provided to receive the polynomial PC, and to an input E1 of the multiplexer MUX. The output of the register REG4 is linked to a first input of the multiplier MLT and to an input E1 of the circuit CRCORE. The register REG2 has an input linked to a specific link SLi and is provided to receive the any mask R1. It comprises an output linked to an input E2 of the multiplexer to transfer the mask R1 to the adder. The register REG3 has an input linked to a specific link SLi and is provided to receive the random number r2. It comprises an output linked to a second input of the multiplier MLT, which comprises an output linked to an input E3 of the multiplexer MUX. The register REG5 has an input linked to the output of the adder and an output linked to an input E4 of the multiplexer MUX. The multiplexer comprises two outputs S2, S3 connected to the inputs of the adder and an output S1 linked to an input E2 of the circuit CRCORE, which is also linked to the output of the adder. The latter supplies a code CRC to the register REGS, the output of which is linked to the bus DB. The unit CTU controls the data paths in the multiplexer MUX to link the inputs E1 to E4 to the outputs S1 to S3 and perform operations whereof examples are schematically described below. These operations are preceded by a step of loading the generator polynomial into the register REG1, then of transferring the polynomial into the register REG4. The polynomial PC is thus applied to the first input of the multiplier MLT and to the input E1 of the circuit CRCORE.

1) Calculating CRC(PC, D1):
1a) Loading data: loading D1 into REG1, loading R1 into REG2, loading r2 into REG3, applying PC and r2 to the multiplier MLT, that supplies R2.
1b) Calculating the data item D3: applying R2 to the input E1 of the adder AD1 through the output S2 of the multiplexer. Applying D1 to the input E2 of the adder through the output S3 of the multiplexer, and putting the output S1 to high impedance. The adder supplies D3.
1c) Removing the mask R1: loading D3 into REG5, applying D3 to the input E2 of the adder through the output S3 of the multiplexer, applying R1 to the input E1 of the adder through the output S2 of the multiplexer and putting the output S1 to high impedance. The adder supplies the data item D2.
1d) Calculating the code CRC: activating the circuit CRCORE, which receives PC and D2. The circuit CRCORE supplies the input of REGS with the code CRC. Transferring the code CRC onto the bus DB through REGS.

2) Calculating CRC(PC, D2):

2a) Loading D2 into REG1, applying D2 to the input E2 of the circuit CRCORE through the output S1 of the multiplexer and putting the output of the adder to high impedance.

2b) Calculating the code CRC as described above.

3) Calculating CRC(PC, D):

3a) Loading D into REG1, loading r2 into REG3, applying PC and r2 to the multiplier MLT, which supplies R2.

3b) Applying R2 to the input E1 of the adder AD1 through the output S2 of the multiplexer. Applying D to the input E2 of the adder through the output S3. The adder supplies D2.

3c) Calculating the code CRC as described above.

Example 3 relates to the first code CRC calculation of the unmasked data item D. It may however be desirable to never apply the unmasked data item D to the data bus. For this purpose, the processor can be configured to generate the masked data item D1 or D2 itself from the mask R1 or from the number r2 supplied by the generator RGEN, as described above, and to supply the masked data item D1 or D2 to the circuit CRCCT. This operation can however be performed in certain applications with data that is not very sensitive, or during a step of customizing the device performed in a secure place.

Figure 10:
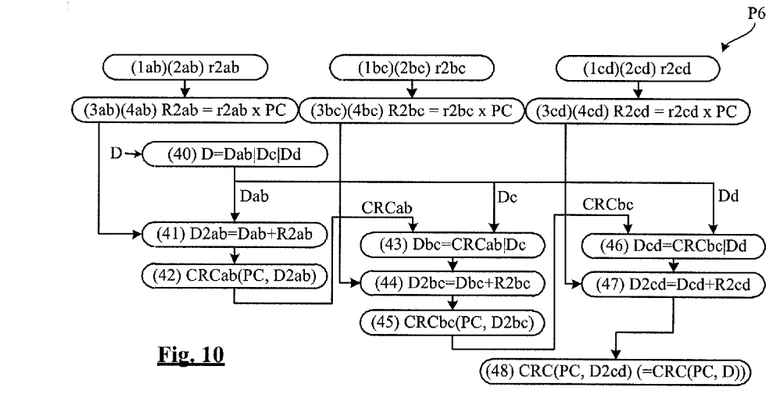
FIG. 10 shows a second alternative of certain steps of the data processing method according to the present invention.

It will be understood by those skilled in the art that the circuit CRCCT is susceptible of various other alternative embodiments. A method for calculating the code CRC according to the present invention is also susceptible of various other alternatives. In particular, the code CRC can be calculated in successive runs from F fragments of the data item D, for example when the input register REG1 of the circuit CRCCT is of insufficient size to receive the N bits of the data item D. FIG. 10 shows an example of a method for calculating the code CRC in successive runs from masked fragments of the data item.

The method comprises a step of generating 1$ab$ or a step of acquiring 2$ab$ a first random number r2$ab$, a step of generating 1$bc$ or acquiring 2$bc$ a second random number r2$bc$, and a step of generating 1$cd$ or a step of acquiring 2$cd$ a third random number r2$cd$. Step 1$ab$ or 2$ab$ is followed by a step 3$ab$ of generating a first fragment of mask R2$ab$, by multiplying r2$ab$ by PC. Step 1$bc$ or 2$bc$ is followed by a step 3$bc$ of generating a second fragment of mask R2$bc$, by multiplying r2$bc$ by PC. Step 1$cd$ or 2$cd$ is followed by a step 3$cd$ of generating a third fragment of mask R2$cd$, by multiplying r2$cd$ by PC. Alternatively, and in particular during the above-mentioned phases P3 or P4, step 3$ab$ can be replaced with a step 4$ab$ of acquiring the fragment of mask R2$ab$, step 3$bc$ can be replaced with a step 4$bc$ of acquiring the fragment of mask R2$bc$, and step 3$cd$ can be replaced with a step 4$cd$ of acquiring the fragment of mask R2$cd$.

The method then comprises a step 40 of splitting the data item into three fragments Dab, Dc and Dd. The fragment Dab, or the most significant fragment, has a length (i.e. a number of bits) that is twice that of the two other fragments Dc, Dd. For example, if the data item is 128 bits, the fragment Dab is 64 bits and the two other fragments are 32 bits. During a step 41, the fragment Dab is masked by means of the fragment of mask R2$ab$, to obtain a masked data item fragment D2$ab$. During a step 42, an intermediate cyclic redundancy check code CRCab is calculated from the masked data item fragment D2$ab$ and from the polynomial PC. During a step 43, the intermediate code CRCab is concatenated as a most significant data item fragment with the data item fragment Dc, to form a data item fragment Dbc=CRCab|Dc ("|" representing the concatenation operator). During a step 44, the fragment Dbc is masked by means of the fragment of mask R2$bc$, to obtain a masked data item fragment D2$bc$. During a step 45, an intermediate cyclic redundancy check code CRCbc is calculated from the fragment D2$bc$ and from PC. During a step 46, the intermediate code CRCbc is concatenated as a most significant data item fragment with the data item fragment Dd, to form a data item fragment Dcd=CRCbc|Dd. During a step 47, the fragment Dcd is masked by means of the fragment of mask R2$cd$, to obtain a masked intermediate data item fragment D2$cd$. During a step 48, a cyclic redundancy check code CRCcd is calculated from the masked intermediate data item fragment D2$cd$ and from the polynomial PC. This code is both the code CRC of the intermediate fragment Dcd and the code CRC of the data item D.

The number F of data item fragments may be different to 3, for example F=2 or F>3, depending on the length of the data item and on the size of the registers used to execute the above-mentioned steps. In this case, the number of intermediate codes CRC calculated is equal to F−1.

This method can be implemented by the circuit CRCCT in FIG. 9, by adding the elements shown in dotted lines, i.e. an intermediate register REG6 having its input linked to the output of the circuit CRCORE, a concatenation register GREG having an input linked to the output of the register REG6 and an input linked to the output of the register REG1, and an output linked to an input E5 of the multiplexer. In this case, the register REG1 first receives the fragment Dab, the circuit CRCORE supplies the code CRCab that is transferred into REG6. The register REG1 then receives the fragment Dc which is concatenated with CRCab in the register CREG, and the circuit CRCORE supplies the code CRCbc that is transferred into REG6. The register REG1 then receives the fragment Dd that is concatenated with CRCbc in GREG, and the circuit CRCORE then supplies the code CRC searched for.

According to one embodiment, the register REG1 comprises several locations for storing fragments Dab, Dc and Dd. According to one embodiment, the random numbers r2$ab$, r2$bc$ and r2$cd$ are identical. In another embodiment, the numbers r2$ab$, r2$bc$ and r2$cd$ are supplied to the circuit CRCCT as the calculation progresses. In yet another embodiment, shown on FIG. 9, the register REG3 comprises several locations for simultaneously storing the numbers r2$ab$, r2$bc$ and r2$cd$, or even other ones, up to a value r2$n$. In this case, when calculating a non-fragmented code CRC, several numbers r2 can be randomly selected by the unit CTU. In yet another embodiment, a random generator is integrated into the circuit CRCCT.

It will be understood by those skilled in the art that a data processing method according to the present invention is susceptible of various other alternative embodiments. A data processing method according to the present invention can in particular be implemented by means of various generator polynomials other than CRC-16-DECT, for example the known generator polynomials CRC-1, CRC-4-ITU, CRC-5-EPC, CRC-5-ITU, CRC-5-USB, CRC-6-ITU, CRC-7, CRC-8-CCITT, CRC-8-Dallas/Maxim, CRC-8, CRC-8-SAE J1850, CRC-8-WCDMA, CRC-10, CRC-11, CRC-12, CRC-15-CAN, CRC-16-IBM, CRC-16-CCITT, CRC-16-T10-DIF, CRC-16-DNP, CRC-16-ARINC, CRC-16-Fletcher, CRC-24, CRC-24-Radix-64 CRC-30, CRC-32-Adler, CRC-32, CRC-32C (Castagnoli), CRC-32K (Koopman), CRC-32Q, CRC-40-GSM, CRC-64-ISO, CRC-64-ECMA-182.

Finally, it will be noted that, in this description and in the claims, the word "random" may mean "pseudo-random". Also, the word "random" may merely mean "that is not known by an attacker", and the mask R1 or R2 may be generated from a known seed and from a deterministic function, as indicated above.

The invention claimed is:

1. A method for processing a binary data item in an electronic device, the method comprising:
receiving the binary data item by a microcircuit of the electronic device;
generating, at the microcircuit, a cyclic redundancy check code for the binary data item using a generator polynomial;
masking, at the microcircuit using polynomial addition, the binary data item with a binary mask; and
at least one of:
 storing, by the microcircuit, the masked binary data item in a memory of the electronic device; or
 transferring, by the microcircuit; the masked binary data item to another device, wherein:
 the cyclic redundancy check code for the binary data item is generated from the masked binary data item to prevent discovery of the binary data item by a side-channel attack during the generating the cyclic redundancy check, and
 the binary mask is a multiple of a random number and the generator polynomial, such that the cyclic redundancy check code of the masked binary data item is the same result as the cyclic redundancy check code of the binary data item.

2. The method according to claim 1, further comprising:
splitting the binary data item into at least two portions;
masking a first portion of the binary data item with a first binary mask that is a multiple of the generator polynomial and a first random number;
generating a first cyclic redundancy check code for the first masked portion;
concatenating the first cyclic redundancy check code with a next portion of the binary data item to form an intermediate binary data item;
masking the intermediate binary data item with a second binary mask that is a multiple of the generator polynomial and a second random number; and
generating a second cyclic redundancy check code for the masked intermediate binary data item.

3. The method according to claim 1, further comprising generating the binary mask, the generating the binary mask including:
generating the random number; and
multiplying the random number by the generator polynomial.

4. The method according to claim 1, wherein the binary data item includes N bits, the generator polynomial includes P bits, and the random number includes at least N–P bits.

5. The method according to claim 1, further comprising generating the binary mask, the generating the binary mask including:
generating a plurality of random numbers;
multiplying each of the plurality of random numbers by the generator polynomial to obtain a plurality of respective mask portions; and
concatenating the plurality of respective mask portions.

6. The method according to claim 5, wherein the binary data item includes N bits, the generator polynomial includes P bits, and each of the plurality of random numbers includes a number of bits equal to (N−nP)/n, n being a number of random numbers included in the plurality of random numbers.

7. The method according to claim 1, wherein the binary data item includes a binary data item that is masked with a storage or transfer mask, the storage or transfer mask being a random binary mask, the method further comprising, prior to calculating the cyclic redundancy check code for the binary data item using the generator polynomial:
receiving, with the binary data item masked with the storage or transfer mask, a cyclic redundancy check code for the binary data item masked with the storage or transfer mask;
removing the storage or transfer mask from the binary data item masked with the storage or transfer mask to obtain the binary data item; and
after generating the cyclic redundancy check code for the binary data item using the generator polynomial, comparing the cyclic redundancy check code for the binary data item masked with the storage or transfer mask and the cyclic redundancy check code for the binary data item generated using the generator polynomial.

8. The method according to claim 1, wherein the binary data item includes a binary data item that is masked with a storage or transfer mask, the storage or transfer mask being a random binary mask, the method further comprising:
prior to calculating the cyclic redundancy check code for the binary data item using the generator polynomial, receiving, with the binary data item that is masked with the storage or transfer mask, a cyclic redundancy check code for the binary data item that is masked with the storage or transfer mask;
after masking, using polynomial addition, the binary data item that is masked with the storage or transfer mask with the binary mask that is a multiple of the generator polynomial and a random number, and before generating, with the generator polynomial, the cyclic redundancy check code for the binary data item from the binary data item that is masked with the binary mask that is a multiple of the generator polynomial and a random number, removing the storage or transfer mask from the binary data item that is masked with both the storage or transfer mask and the binary mask that is a multiple of the generator polynomial and a random number; and
comparing the cyclic redundancy check code for the binary data item from the binary data item that is masked with the binary mask that is a multiple of the generator polynomial and a random number and the cyclic redundancy check code for the binary data item that is masked with the storage or transfer mask.

9. The method according to claim 1, wherein the cyclic redundancy check code for the binary data item that is generated from the masked binary data item is a first cyclic redundancy check code, and the binary data item includes a binary data item that is masked with a storage or transfer mask, the storage or transfer mask being a random binary mask, the method further comprising:
prior to calculating the cyclic redundancy check code for the binary data item using the generator polynomial, receiving, with the binary data item that is masked with the storage or transfer mask, a second cyclic redundancy check code, the second cyclic redundancy check code being a cyclic redundancy check code for the binary data item that is masked with the storage or transfer mask; and comparing the first cyclic redundancy check code and the second cyclic redundancy check code.

10. An electronic device for processing a binary data item, wherein the electronic device is configured to implement the method according to claim 1.

11. A method for storing or transferring a binary data item, comprising:

receiving the binary data item by a microcircuit;

masking, at the microcircuit using polynomial addition, the binary data item with a binary mask that is a random multiple of a generator polynomial for generating a cyclic redundancy check code;

generating, from the masked binary data item using the generator polynomial, the cyclic redundancy check code, wherein:

the generating the cyclic redundancy check from the masked binary data item prevents discovery of the binary data item by a side-channel attack during the generating the cyclic redundancy check, and the cyclic redundancy check code of the masked binary data item is the same result as a cyclic redundancy check code of the binary data item; and at least one of storing in, or transferring to an electronic device, the masked binary data item and the cyclic redundancy check code to decode the masked binary data item.

12. The method according to claim 11, further comprising generating the binary mask by:

generating the random number; and multiplying the random number by the generator polynomial.

13. The method according to claim 11, further comprising generating the binary mask by:

generating a plurality of random numbers;

multiplying each of the plurality of random numbers by the generator polynomial to obtain a plurality of respective mask portions; and concatenating the plurality of respective mask portions.

14. An electronic device comprising a circuit configured to store or transfer a binary data item in accordance with the method according to claim 11.

* * * * *

UNITED STATES PATENT AND TRADEMARK OFFICE
CERTIFICATE OF CORRECTION

PATENT NO. : 9,977,899 B2
APPLICATION NO. : 14/397330
DATED : May 22, 2018
INVENTOR(S) : Roussellet et al.

Page 1 of 1

It is certified that error appears in the above-identified patent and that said Letters Patent is hereby corrected as shown below:

On the Title Page

Item (*), in "Notice", Line 3, delete "days. days." and insert -- days. --, therefor.

In the Claims

In Column 13, Line 21, Claim 1, delete "microcircuit;" and insert -- microcircuit, --, therefor.

Signed and Sealed this
Seventh Day of August, 2018

Andrei Iancu
*Director of the United States Patent and Trademark Office*